Sept. 1, 1959     R. C. BRENK ET AL     2,902,139
TREATING THE ENDS OF ELONGATED WORKPIECES
Filed Oct. 1, 1956     10 Sheets-Sheet 1

INVENTORS.
Robert C. Brenk
Frank F. Cizek
Richard E. Dorenbos
By Walter L. Schlegel Jr. Atty.

Witness:
Ralph M. Faust

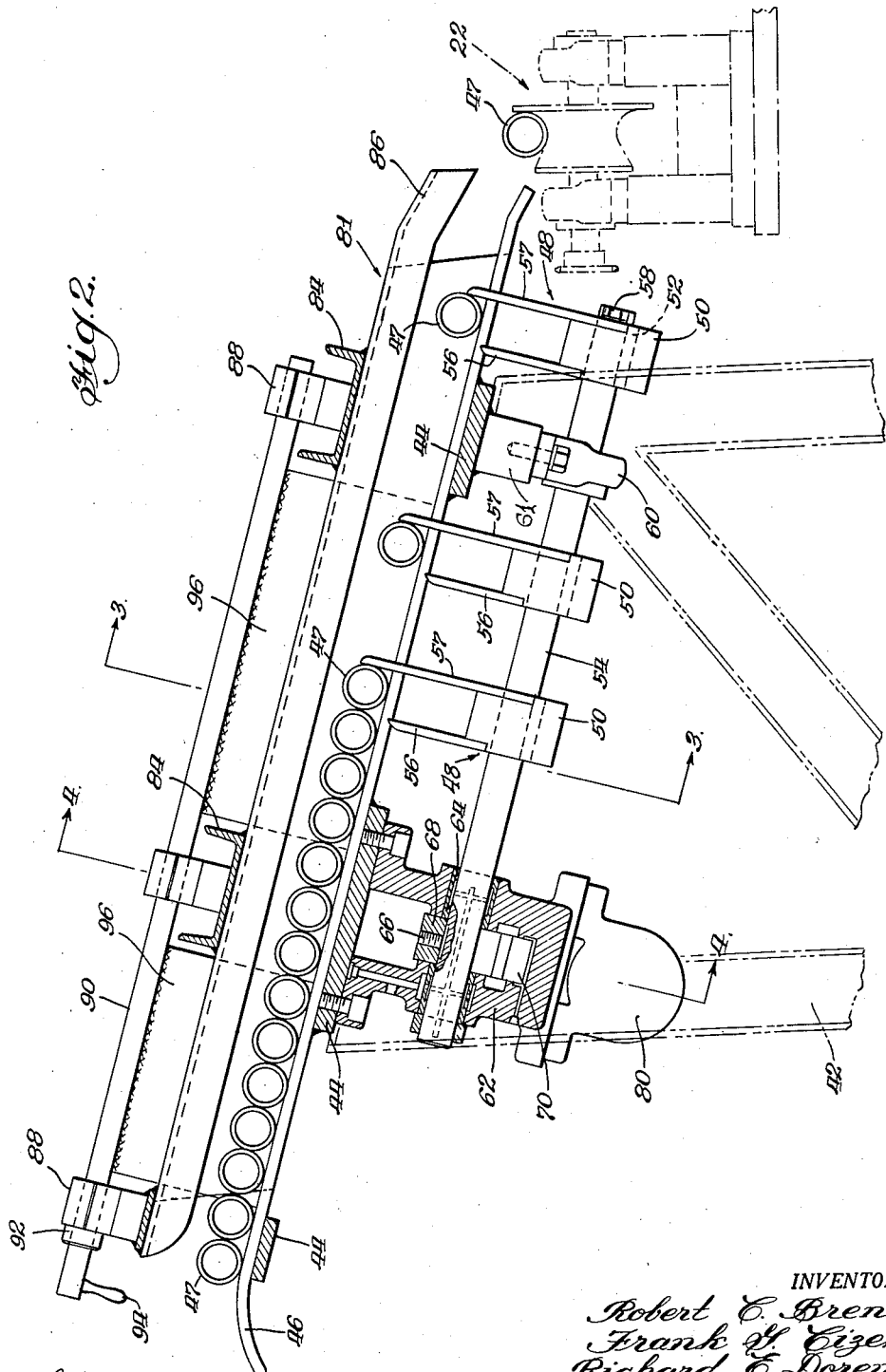

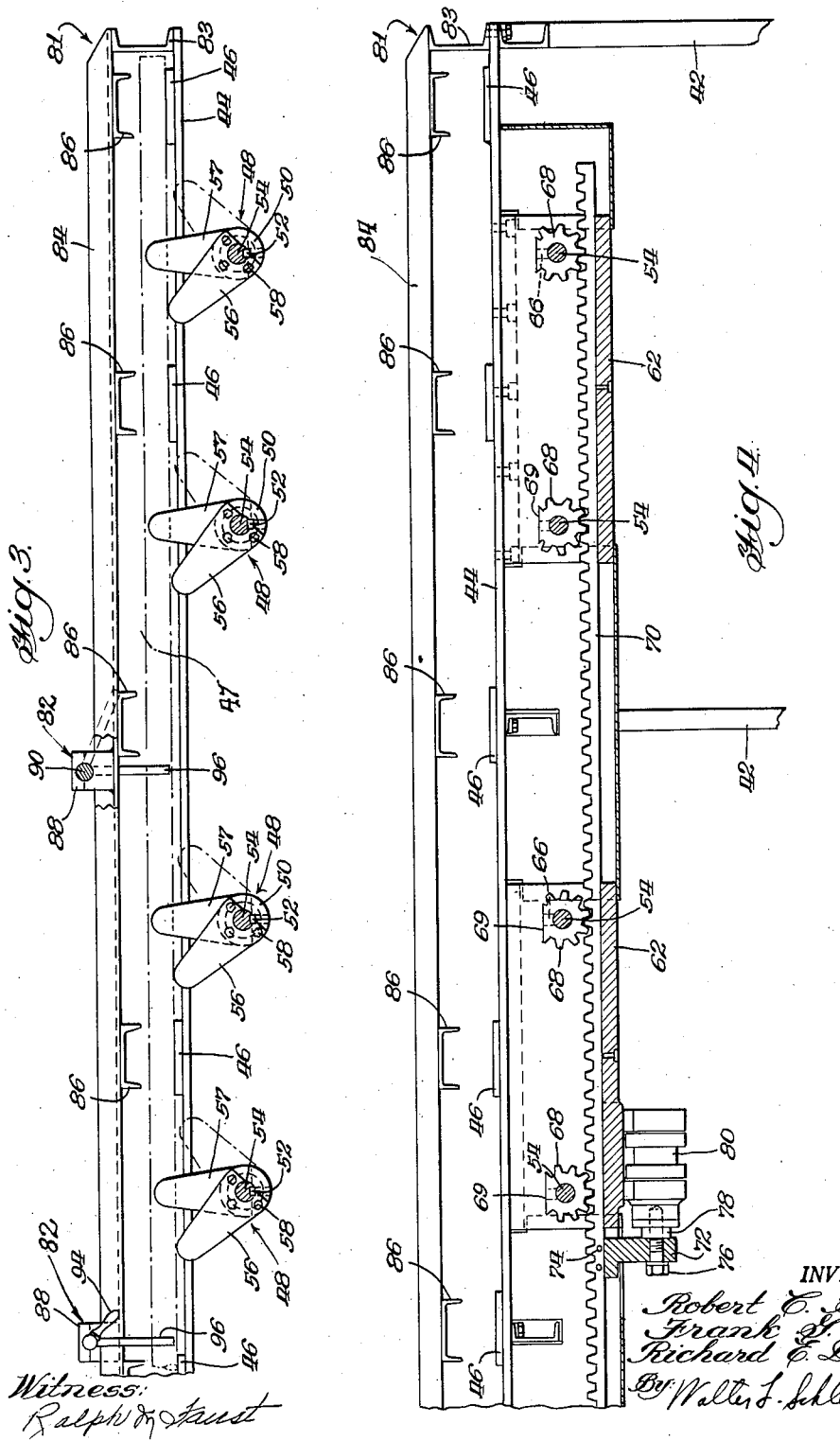

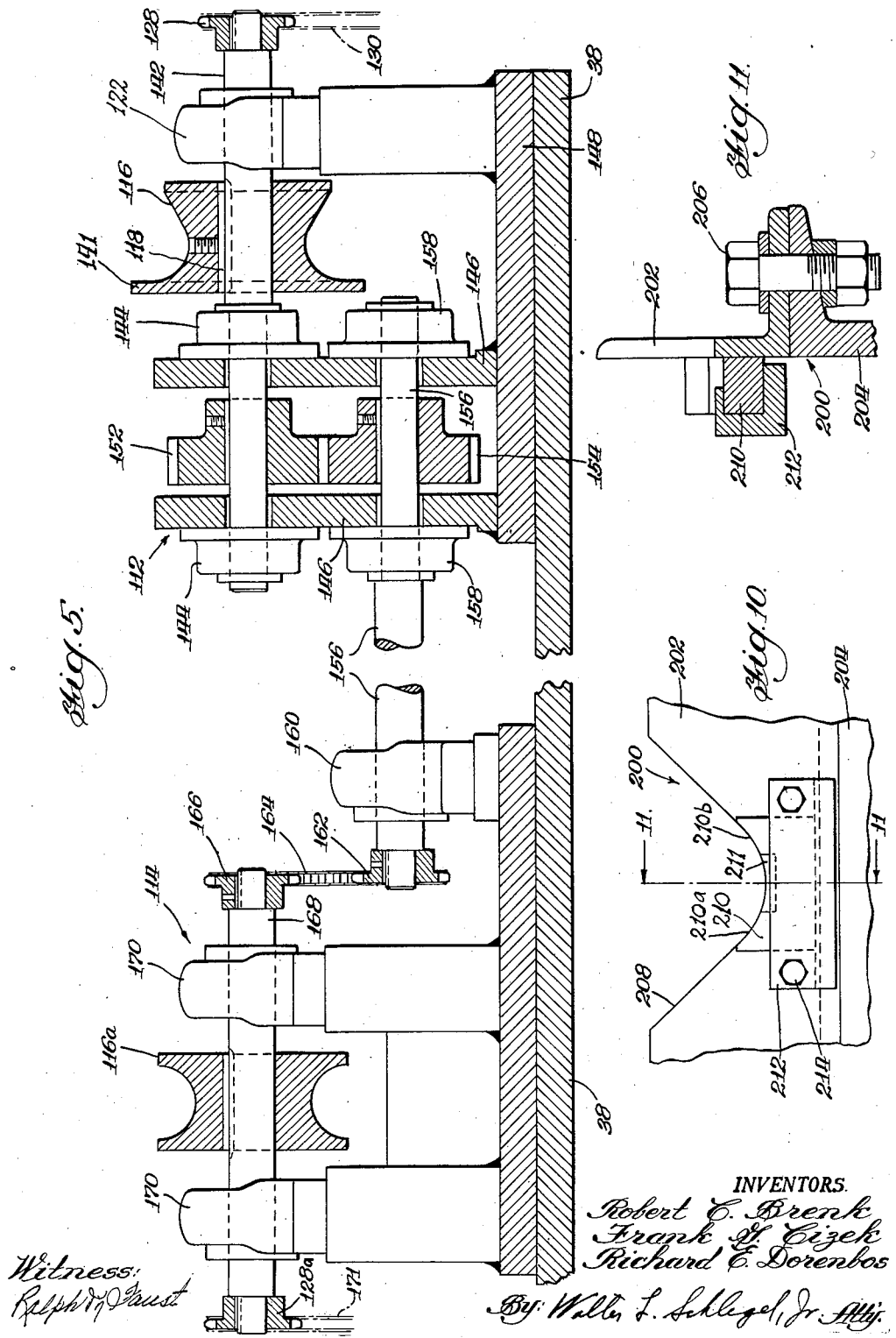

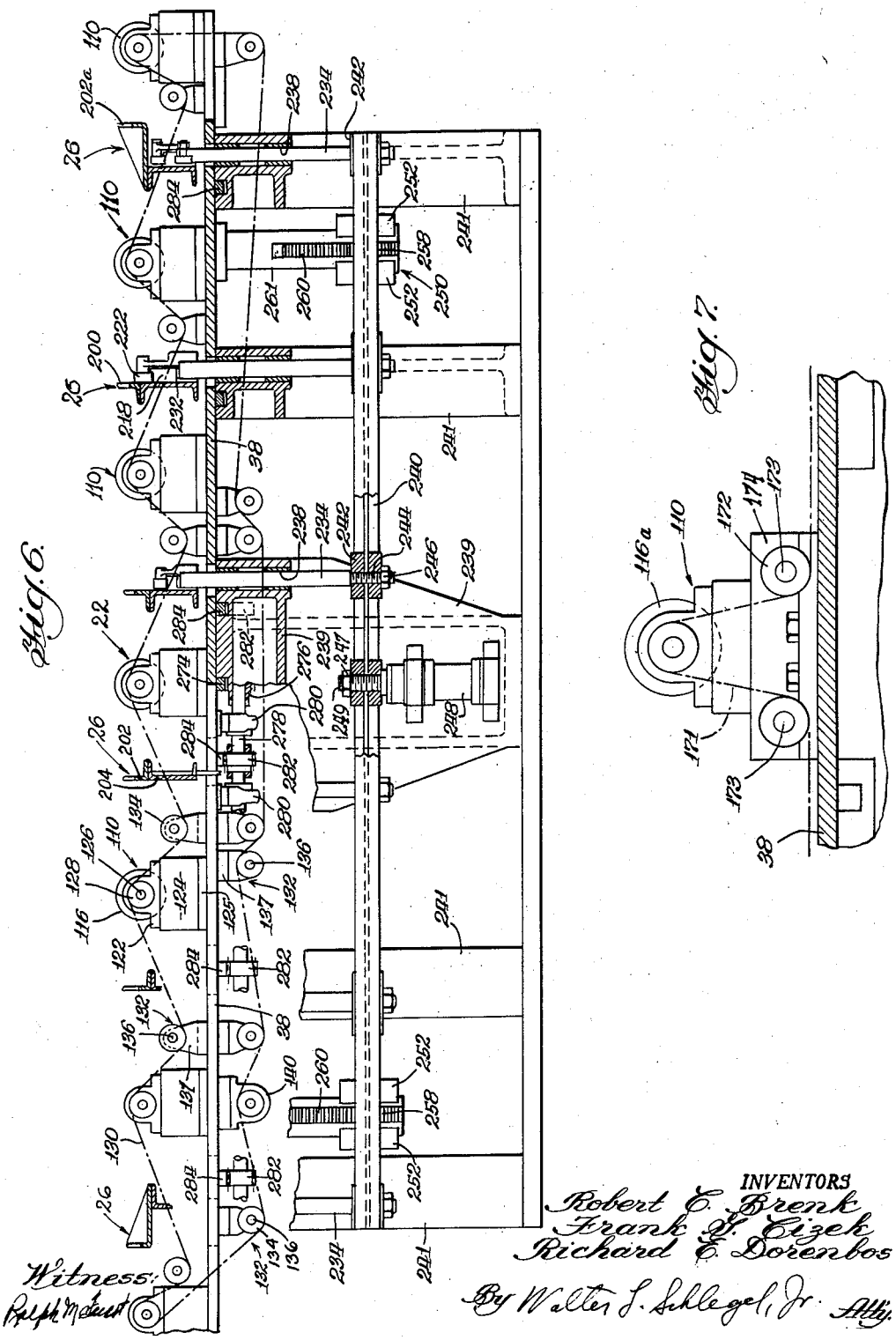

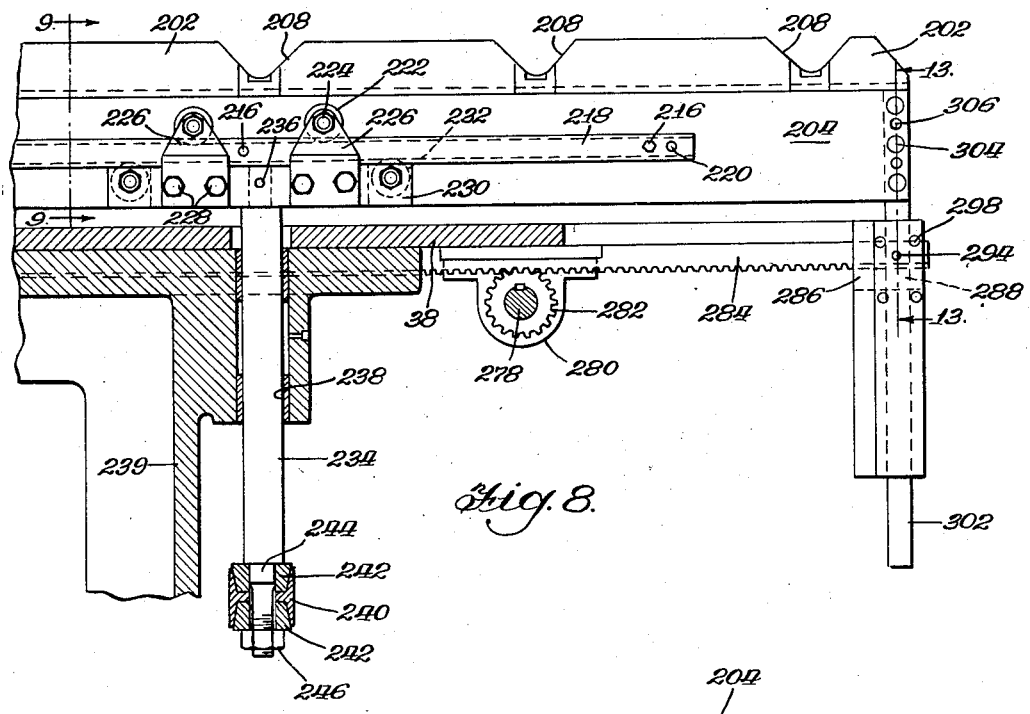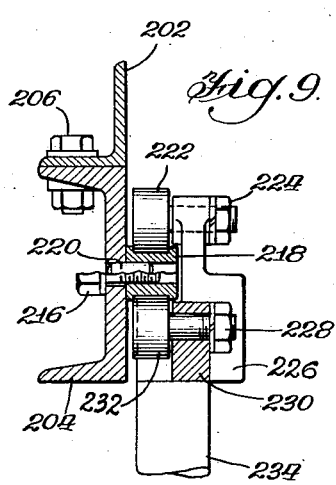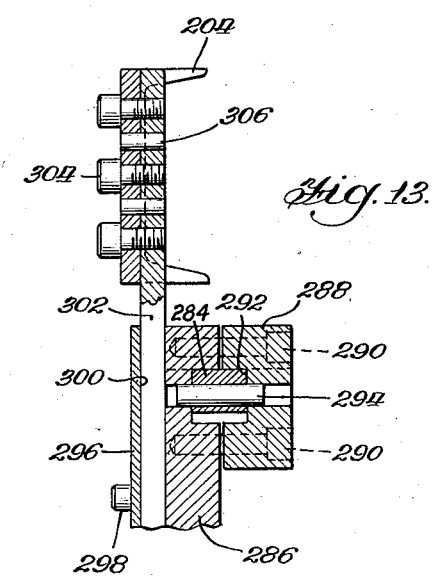

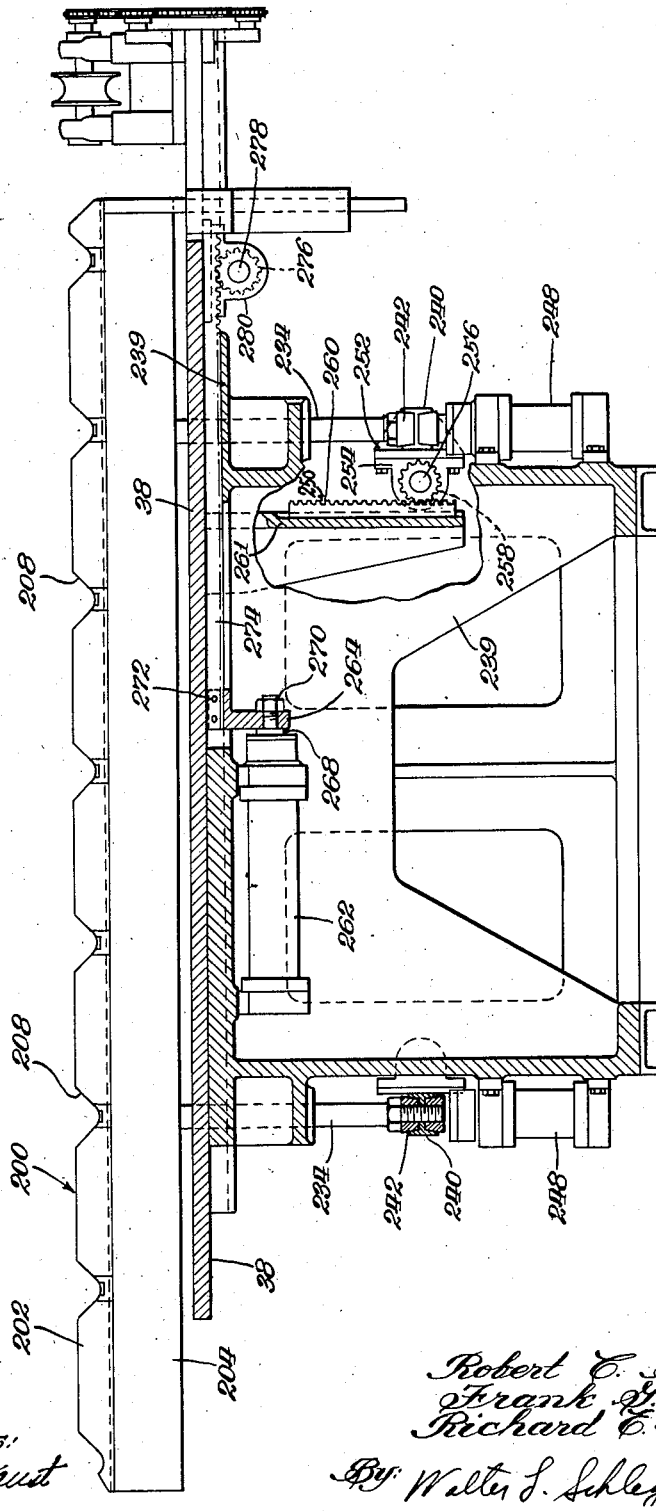

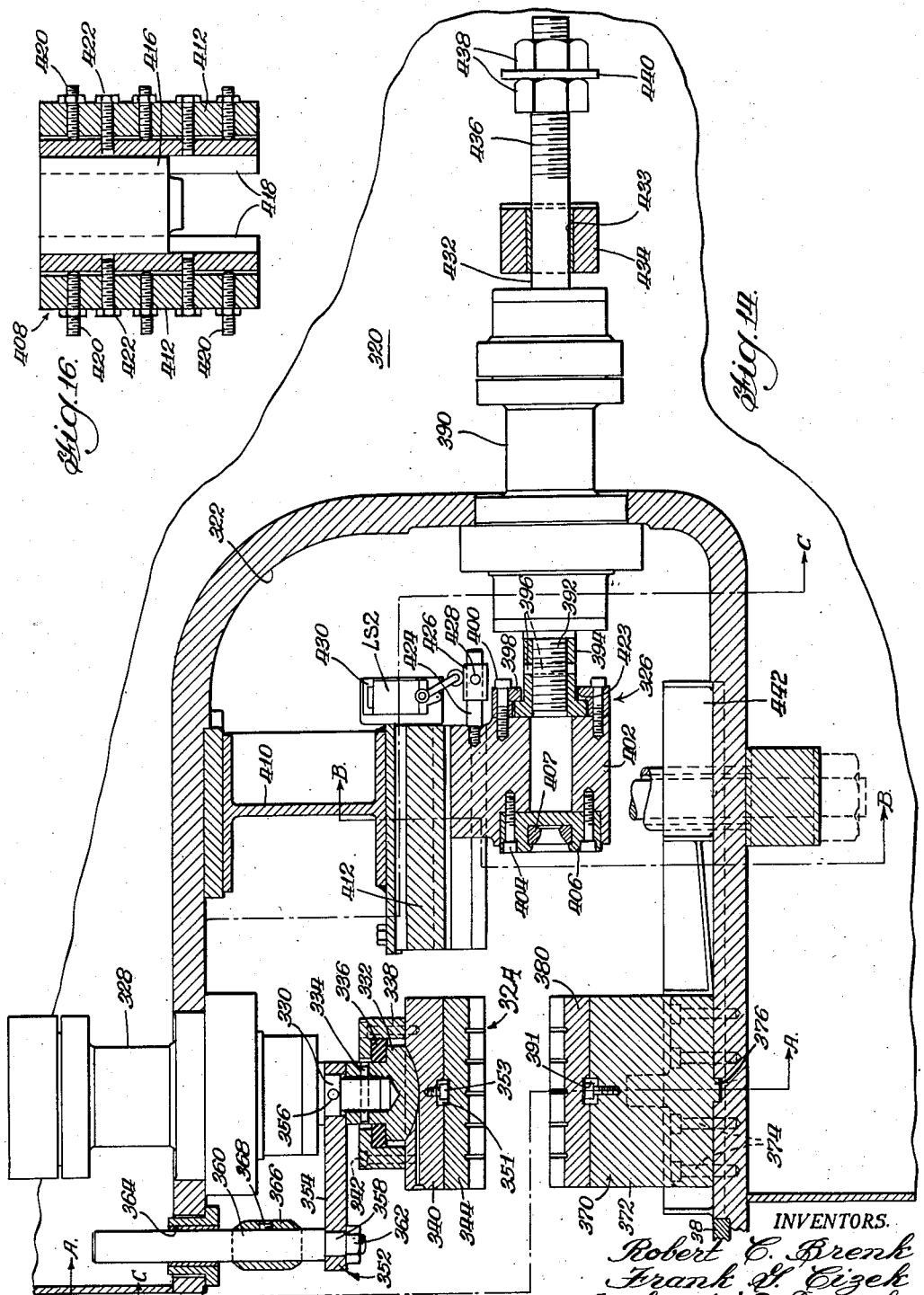

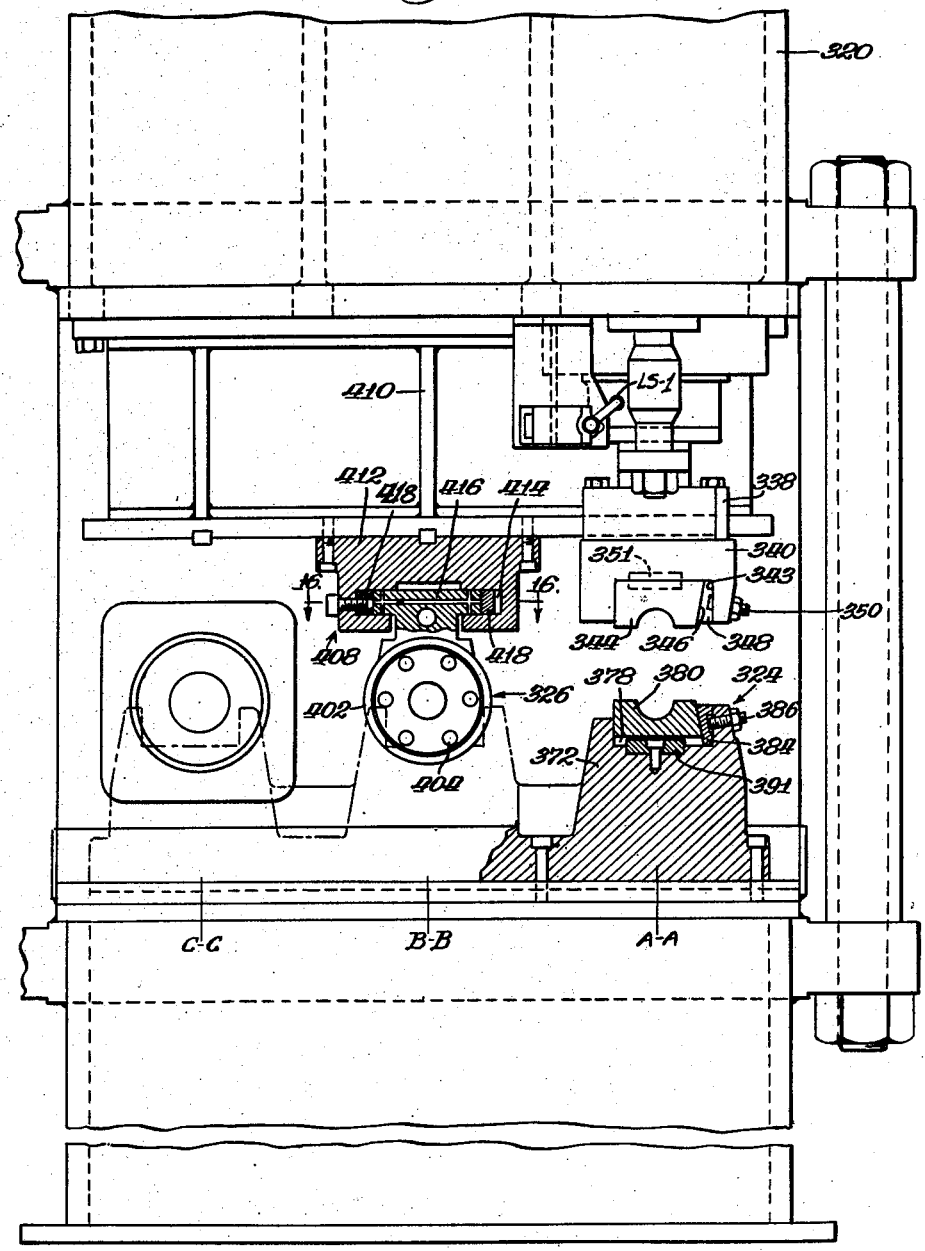

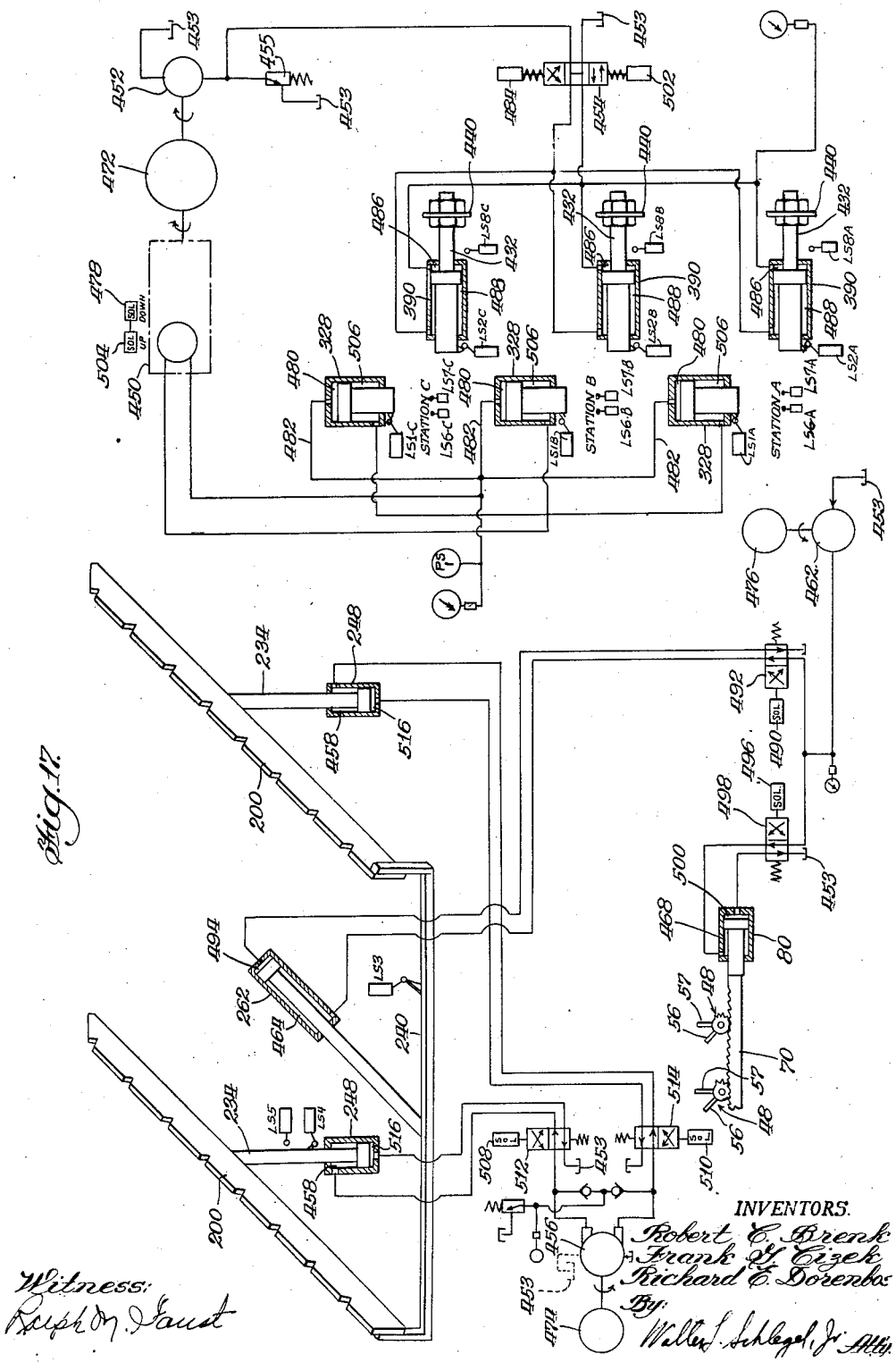

United States Patent Office 2,902,139
Patented Sept. 1, 1959

2,902,139

TREATING THE ENDS OF ELONGATED WORKPIECES

Robert C. Brenk and Frank G. Cizek, Cincinnati, and Richard E. Dorenbos, Greenhills, Ohio, assignors to American Steel Foundries, Chicago, Ill., a corporation of New Jersey Application October 1, 1956, Serial No. 613,272

2 Claims. (Cl. 198—19)

This invention relates to metal shaping equipment and more particularly to a machine for reducing the diameter of the ends of metal tubes.

One of the objects of the invention is the provision of an automatic device for reducing the diameter of one or both ends of a metal tube.

Another object is the provision of a device for forming opposite ends of metal tubes accurately and quickly and with a minimum amount of manual handling.

Another object of the invention is the provision of a tube reducing press capable of accommodating a wide range of tube lengths without any adjustments being made on the press to accommodate the varying lengths.

Still another object is the provision of a tube reducing press for reducing both ends of metal tubes in multiple steps and the incorporation in the machine of means for transferring the tubes from station to station without the necessity of repositioning the tubes longitudinally thereof.

Another object of the invention is to provide a machine of the type described incorporating relatively simple mechanisms with the resulting freedom from excessive maintenance problems.

Another object is the provision of a tube reducing press having control devices adapted to automatically stop the machine if any malfunction occurs thereby avoiding damage to the machine and production of defective tubes.

Other objects and advantages will become apparent from the following specification and the accompanying drawings, in which:

Figure 1 is a top plan view of a preferred embodiment of the automatic tube reducing press with certain details omitted which can be shown to better advantage in other views;

Figure 2 is a sectional view taken at line 2—2 of Figure 1 illustrating the tube feed chute;

Figure 3 is a sectional view taken at line 3—3 of Figure 2 illustrating the tube escapement device;

Figure 4 is a sectional view taken at line 4—4 of Figure 2 illustrating the actuating mechanism for the escapement device;

Figure 5 is a sectional view taken at line 5—5 of Figure 1 illustrating the feed roller mounting construction and the reversing roller drive mechanism;

Figure 6 is a sectional view taken at line 6—6 of Figure 1 illustrating the drive mechanism for the feed rollers and a portion of the actuating mechanism for the shuttle bars;

Figure 7 is a fragmentary sectional view taken at line 7—7 of Figure 1 illustrating a typical reversing roller;

Figure 8 is a fragmentary sectional view taken at line 8—8 of Figure 1 illustrating a portion of the shuttle bar mechanism;

Figure 9 is a fragmentary sectional view taken at line 9—9 of Figure 8 illustrating the shuttle bar mounting arrangement;

Figure 10 is a fragmentary elevational view of the notched portion of a shuttle bar;

Figure 11 is a sectional view of the shuttle bar assembly taken substantially at the line 11—11 of Figure 10;

Figure 12 is a sectional view taken at line 12—12 of Figure 1 illustrating the shuttle bar actuating means;

Figure 13 is a fragmentary sectional view through the shuttle bar assembly taken substantially at line 13—13 of Figure 8;

Figure 14 is a vertical section through the clamping and forming portion of the press utilized in the device;

Figure 15 is a composite elevational view showing the three forming stations of the preferred embodiment of the invention but in different sections so that the construction may be more clearly shown and wherein Figures 15A—A, B—B and C—C are sections taken substantially at the lines A—A, B—B and C—C of Figure 14, respectively;

Figure 16 is a sectional view of the die adjusting means taken at the line 16—16 of Figure 15, and Figure 17 is a schematic diagram of the hydraulic circuit for the automatic tube reducing press.

The sequential steps by which a metal tube progresses through the tube reducing machine for the purpose of reducing the diameter of the ends of the tube are best explained relative to Figure 1 in which most of the detailed structure is omitted but which illustrates the correlation of the various elements of the machine. The tubes are loaded into a feed chute indicated generally at 20 and are automatically fed individually and in timed sequence onto a plurality of feed rollers indicated generally as a feed or positioning roller assembly 22. The feed rollers, which are preferably continuously rotating, advance the tube axially thereof against a stop 24. Shuttle bars, indicated generally at 26, advance the tube, in a direction normal to the axis thereof, successively to to the several stations of a right hand forming press indicated generally at 28 in which the diameter of one end of the tube is reduced. The press illustrated in the preferred embodiment has three stations but the number of stations may be varied depending on the amount of diametral reduction desired in the tube. When the operation at the last right hand press station is completed, the shuttle bars transfer the tube onto a plurality of reversing rollers indicated generally at 30 which move the tube against a stop 32. The shuttle bars then advance the tube through successive stations of a left hand tube reducing press 34 wherein the diameter of the second end of the tube is reduced. The completed tube is then deposited by the shuttle bars onto a suitable discharge ramp 36 which guides the tubes into suitable storage racks or containers (not shown).

The structural elements of the feed rollers and shuttle bars are supported primarily by a table 38 which in turn is supported by the presses and by suitable framework indicated generally at 40.

The illustrated embodiment of the tube reducing press accommodates tubes varying in length from 36 inches to 13 feet, 6 inches without any adjustments being required in the press to accommodate the varying lengths. On other tube reducing presses the reducing rams and other parts of the press must be repositioned to accommodate varying lengths of tubes and this repositioning of press parts is generally time consuming and therefore costly. It is obvious that the press need not necessarily be limited to the particular lengths noted above. It should also be noted that the operation of the tube reducing press is continuous. When the machine is in operation, as a tube is indexed by the shuttle bars from rollers 22 to the first press station, another tube is automatically fed from the feed chute onto the rollers. Consequently, once the first tube has progressed through the machine, there will be a tube at each of the sequential positions through the press until tubes are no longer fed to the feed chute.

*Feed chute*

Referring now to Figures 2, 3 and 4, which illustrate the construction of the feed chute, it is seen that the feed chute comprises a frame section 42 which is an extension of the main frame 40 and supports a plurality of spaced support plates 44 extending laterally of the chute. Secured to the support plates 44 and extending lengthwise of the chute are a plurality of spaced ramp members 46. The plates 44 and the members 46 form a lattice work which is light yet strong enough to accommodate the weight of tubes 47 (Figure 2) which are fed into the chute. It may be seen in Figure 2 that the discharge end of the ramp members 46 are positioned in such a manner that the tubes 47, when released in a manner to be described hereinafter, will be deposited directly onto the continuously rotating feed rollers 22 which are shown in phantom lines in Figure 2.

The tubes 47 are released one at a time by means of finger assemblies indicated generally at 48 which are best seen in Figures 2 and 3. Each finger assembly comprises a finger block 50 keyed as at 52 to a rotatable drive shaft 54 for rotational oscillating movement therewith. A pair of fingers 56 and 57 are secured in angular spaced relationship to opposite faces of the block 50 by means of cap screws 58. The finger assemblies 48 are positioned in such a manner that when oscillated through an angle of approximately 45°, one of the fingers is disposed below the level of the upper surface of the ramp members 46 while the other finger is extending above the ramp members 46. The finger assemblies, at the start of a cycle, are positioned so that fingers 56 extend above the ramp so that no tubes could, at this time, pass these fingers. If the finger assemblies are now oscillated into the position illustrated in Figures 2 and 3 a tube advances past finger 56 but is immediately restrained by fingers 57. Oscillating the finger assemblies alternately in opposite directions advances the tubes past the finger assemblies to be deposited one at a time onto rollers 22. Referring to Figure 2, it is seen that three finger assemblies have been provided, but it should be understood that one finger assembly would be sufficient for operation of the machine. The two additional finger assemblies have been provided as a safety measure.

Each of the shafts 54, which carry the finger assemblies, is supported toward one end thereof by means of a pillow block type anti-friction bearing 60 (Figure 2) which is bolted to a pad 61 secured to one of the support plates 44. The other end of the shaft extends into and is supported by a generally U-shaped housing 62 which is preferably bolted to a support plate 44. Received over the shaft 54 and disposed within the open portion of the U-shaped housing 62 is a pinion segment 68 which is secured for rotary movement with the shaft by means of a dog point set screw 66. The pinion 68 is operatively engaged with a rack 70 which is supported by the closed lower portion of the housing 62. As best seen in Figure 4, the housing 62 is made sufficiently long so that only one such housing is required for each adjacent pair of shafts 54. The pinions 68 are converted to segments by machining thereon a flat 69 (Figure 4) to facilitate drilling and tapping the holes for the set screws 66.

Depending from the rack 70 and secured thereto by a plurality of pins 74 is a bracket 72 (Figure 4), the lower portion of which is secured by means of a cap screw 76 to the piston rod 78 of a fluid actuated cylinder 80. In operation, the cylinder is actuated in timed sequence in a manner to be explained hereinafter in conjunction with the hydraulic diagram of Figure 17, and the rack is thereby moved alternately to the left and to the right, as viewed in Figure 4. The motion of the rack is transmitted as an oscillating motion through the pinion 68 to the shafts 54.

As explained heretofore, in the preferred embodiment of the invention, it is desirable to form the ends of tubes which might range from 36 inches to 13 feet 6 inches in length. In order for the press to function properly it is also essential that two tubes are never fed simultaneously in end-to-end relationship onto the feed rollers 22. The reason for this is that opposite ends of each tube are diametrally reduced without rotating or reversing the axis of the tube. Instead, the tube is formed by a right and a left hand press positioned at opposite ends of the tube. Therefore, if two tubes were advanced through the machine in end-to-end relationship, only one end of each tube would be properly formed. In order to prevent this from taking place, there is provided an upper frame generally indicated at 81 which supports a pair of flag or stop assemblies 82. The upper frame 81 is supported by a plurality of channel members 83 (Figures 3 and 4) extending upwardly from each of the support plates 44 and comprises a lattice work made up of a plurality of transverse channels 84 welded or otherwise secured to the channel members 83 and carrying a plurality of upper frame members 86 disposed at right angles to the channels 84. Secured to the transverse channels 84 are a plurality of shaft supporting pillow block bearings 88 which rotatably carry a flag shaft 90 positioned axially thereof by means of a collar 92 (Figure 2) and provided with an operating handle 94 by means of which the shaft 90 may be manually operated for a purpose to be described hereinafter. Preferably welded to each of the shafts 90 are a pair of flags 96 (Figures 2 and 3) each of which is movable from the position shown by the solid line in the central portion of Figure 3 to the position shown by the dotted line.

Referring to Figure 3, it should be noted that this figure is illustrated as it would appear looking forwardly down the feed chute in the direction of tube travel. It should also be noted that the flag positioned to the right in Figure 3 is located at a distance slightly over 54 inches from the channel member 83 and that the flag positioned to the left in Figure 3 is located in the range of 100 to 104 inches from the channel member 83. Before operating the device, the tubes are sorted into three groups, one group containing random lengths of tubes ranging from 36 inches to approximately 54 inches; another group containing random lengths of tubes ranging from approximately 55 inches to 100 inches; and the third group containing random lengths of tubes ranging from over 100 inches to 162 inches, which is the maximum length of tube which can be accommodated in the disclosed embodiment of the invention.

When it is desired to form the tubes from the longest of the above ranges, both of the flags 96 are rotated to their upward position so that they cannot interfere with tubes rolling down the ramp members 46. In this instance, it is impossible for two tubes to roll down the ramp in end to end relationship because the lengths of two of the shortest tubes from this group would be at least 200 inches, which is a longer distance than the over-all length of the feed chute.

When it is desired to form the ends of the tubes from the length group ranging from 55 inches to 100 inches, the flag positioned to the left, as viewed in Figure 3, is rotated in a counterclockwise direction into the path of the tubes rolling down the chute as indicated by the solid line position of the left hand flag in Figure 3. Positioning the flag in this manner has the effect of decreasing the effective width of the feed chute to approximately 104 inches. The longest tube of this range, being approximately 100 inches long, will roll unimpeded down the ramp. However, if two of the shortest tubes from this length range were positioned on the ramp in end to end relationship, their combined length would be at least 108 inches. Therefore, one of the tubes would be stopped by the flag and the other would continue down the ramp toward the feed rollers. Thus only one tube may be fed down the ramp past the flags and once again two tubes could not be fed down the ramp in end to end relationship. When it is desired to form the ends of the tubes from the shortest of the three length ranges, both of the flags are rotated in a counterclockwise direction into the path of the tubes being fed down the ramp and into the position shown by the solid lines of the flags in Figure 3. The effective length of the ramp at this time is slightly over 54 inches and will accommodate the longest tube of the group but will not accommodate two of the shortest tubes in end to end relationship because two such tubes would be at least 72 inches long.

From the above description, it is seen that at no time will two tubes be fed down the ramp and onto the feed roller in end to end relationship regardless of the length of the tubes, and therefore there is no danger of only one end of any particular tube being formed as it moves through the reducing presses.

Feed rollers

The feed roller assembly 22 and the reversing roller assembly 30 (Figures 1, 5, 6 and 7) comprise a plurality of aligned individual roller assemblies 110 which, except for the chain drive arrangement and the diameter of the roller flange, are substantially identical. One of the feed roller assemblies, indicated at 112 (Figure 5), and one of the reversing roller assemblies, indicated at 114, are utilized for the transmission of motion to the reversing rollers and for the necessary change of direction of rotation of the reversing rollers. The roller assemblies 112 and 114 are illustrated in Figure 5.

Each of the roller assemblies 110 and assembly 112 comprises a roller 116 having a curvilinear face (as best seen in Figures 1 and 5) for the purpose of providing adequate support for the tubes which are to be deposited thereon. Each roller 116 of the roller assemblies 110 is keyed to a shaft 120 (Figure 1) for rotation therewith. The shaft is supported at either end by antifriction bearings 122 which are secured to a mounting block 124 which is in turn secured to a mounting pad 125 (Figure 6) preferably welded to the table 38. One end of the shaft 120 projects outwardly of the bearing 122 as at 126 to carry for rotation therewith a sprocket 128. All of the sprockets for various sets of feed rollers are aligned and connected by a driving chain 130. Idler assemblies, indicated generally at 132, (Figure 6) are provided for the purpose of keeping the chain tight over each of the sprockets 128. The idler assemblies 132 comprise a sprocket 134 keyed to a shaft 136 for rotation therewith. The shaft 136 is rotatably carried in a conventional pedestal type bearing assembly 137 which is secured to the table 38. A gear head motor 140 is provided beneath the table 38 to drive the chain 30, and a plurality of idler assemblies 132 are utilized under the table to keep the return track of the chain tight.

Referring to Figure 5, it should be noted that the rollers 116, onto which the tubes are deposited from the feed chute and which are illustrated on the right hand side of Figure 5, differ from the individual reversing rollers 116a which are illustrated on the left hand side of Figure 5, in that a larger diameter projecting flange 141 is provided on the first mentioned rollers to prevent the tubes, which are being fed from the feed chute onto the rollers, from rolling off the opposite side of the rollers due to the momentum of the tube.

The roller 116 of roller assembly 112 is keyed as at 118 to a shaft 142 which is supported on the feed chute side of the rollers by a pillow block bearing 122 and supported on the side of the roller opposite the feed chute by a pair of conventional flange type bearings 144. The flange bearings 144 are bolted to a pair of vertical plates 146 which are preferably welded to a base plate 148 bolted or otherwise secured to the table 38.

Keyed to the shaft 142 between the vertical plates 146 is a spur gear 152 operatively engageable with a spur gear 154 keyed to a counter shaft 156 for rotation therewith. The counter shaft 156 is bearing supported by flange type bearings 158 secured to the vertical plates 146 and is additionally supported adjacent the reversing roller assembly 114 by a pillow block bearing 160. The shaft 156 extends beyond the bearing 160 and is provided with a sprocket 162 connected by a chain 164 to a sprocket 166 keyed to a shaft 168 for rotation therewith. The shaft 168 is supported by pillow block bearings 170 and carry for rotation therewith a roller 116a. The shaft 168 carries at the end opposite sprocket 166 a second sprocket 128a which is connected by a chain 171 to the other sprockets 171a (Figure 1) of the reversing rollers whereby the motion of shaft 168 and roller 116a is transmitted to the remaining reversing rollers, as is clearly evident from Figures 1 and 6.

Figure 7 illustrates the typical construction of the chain drive for the reversing rollers and shows the manner in which the chain is kept below the shuttle bar assemblies. The chain is brought almost to the level of the table 38 by a pair of idler sprockets 172 which are keyed to shafts 173 which are in turn rotatably mounted in bearing blocks 174.

Referring to Figure 1, it is seen that at a roller assembly designated 178, the chain drive for the final reversing roller designated 178a, is moved to the opposite side of the rollers in order to clear the press 34. In order to accomplish this, a sprocket 180 is keyed to the shaft 120 of roller assembly 178 and is connected to a sprocket 180a of roller assembly 178a by a chain 182. Idler sprocket assemblies 184, similar to idler sprocket assemblies 132, are provided to keep the chain tight and at a level below the shuttle bar assemblies 26.

The rollers 116 are preferably made of a material formed by saturating sheets of fabric with a phenolic resin, rolling them into a spiral, and curing under heat and pressure. This material is used in order to decrease noise and also because it has desirable frictional qualities. This particular composition is sold under various trade names, of which Formica is one example. Rollers made of this material effectively advance a tube against the locating stop 32, yet still easily slide while in contact with the tube after the tube has reached the stop but before it is lifted from the rollers by the shuttle bars and transferred to the first press station. Obviously, the rollers could be made of other materials such as steel, iron, rubber, nylon, etc., but the resin impregnated and cured laminate combines the best frictional, noise and wear resistance characteristics.

Shuttle bars

After the tube has been positioned against the stop 24 by means of the feed rollers 116, it is transferred to the first press station by means of a plurality of shuttle bar assemblies 26. In the illustrated embodiment of the invention, six interconnected shuttle bar assemblies are illustrated but it is obvious that some other number of assemblies might be used provided at least two points of support are offered for the tube. The shuttle bar assemblies are best seen in Figures 6, and 8 through 13, inclusive.

The tube holding portion of the shuttle bars is indicated generally at 200 and preferably comprises an angle portion 202 (Figures 9, 10 and 11) and a channel portion 204. The purpose of this construction is to provide adequate strength to hold large size tubes and still to keep weight down to a minimum. The angle 202 is bolted to the channel 204 by means of a plurality of bolt and nut assemblies 206 (Figure 11). As best seen in Figures 8 and 12, the angle 202 is provided with a series of notches 208, each of the notches representing a particular station of a cycle of operation. In other words, a notch is aligned with each of the transfer roller assemblies and also with each of the six tube reducing stations of the presses, as will be explained in conjunction with the description of the complete operation.

After a tube has been properly positioned axially thereof, the shuttle bars are moved vertically upward and the tube is received in the notches 208 of the shuttle bars and lifted off of the rollers. The shuttle bars are then moved horizontally a distance of one station and then lowered whereby the tube is deposited at the first press station so that the first press operation may be performed, as will be described in conjunction with the description of the press stations.

To ensure accurate positioning of the tube longitudinally thereof, and to be certain that no longitudinal sliding of the tube occurs during its transfer by the shuttle bars, a magnet 210 (Figures 10 and 11) is positioned at each of the notches 208, the magnets being held in place by means of a retainer 212 which is secured to the angle 202 by means of a plurality of cap screws 214. The magnets are shaped to approximate the contour of the notch 208 and are recessed as at 211. This type of construction has a dual advantage. The recess provides convenient means for holding the magnet in place by the U-shaped retainer 212 as best seen in Figure 11. More important, the recess permits positioning the magnet to afford two spaced holding points as indicated at 210a and 210b for holding the tubes in position and also eliminates the danger of the center of the magnet projecting above the notch in which case a tube being picked up might knock the magnet out of place. As best seen in Figures 8 and 9, a track 218 is secured to the channel 204 preferably by means of a plurality of cap screws 216 and is accurately positioned relative thereto by means of dowel pins 220. Each shuttle bar portion 200, together with the track 218, is carried by upper and lower track rollers 222 and 232, respectively, and is therefore free to move longitudinally relative thereto. The upper track rollers 222 are rotatably mounted on roller brackets 226 by means of stud bolts 224. The roller brackets, in turn, are bolted as at 228 to a lifter bar 230, to which are secured the track rollers 232.

As best seen in Figure 8, the lifter bar 230 is supported by a lift rod 234 which is pinned to the lifter bar as at 236. The lift rod is guidably received through bushed openings 238 in a frame member 239 and the lift rods for each of the shuttle bar assemblies are connected at their lower ends by means of a connecting yoke 240 (Figures 6, 8 and 12) which is preferably an H-beam which gives great strength with a minimum of weight. The means for securing the connecting yoke 240 to each of the lift rods 234 is best seen in Figure 8 and comprises a pair of filler plates 242 received over a small diameter portion 244 of the lift rod 234 and within the hollow portions of the H-section and maintained in assembly by a nut 246. The filler plates 242 are utilized to give an adequate depth of section to rigidly support the lift rods 234. All of the shuttle bar assemblies are thereby tied together and function as a single unit. As best seen in Figure 12, each shuttle bar assembly is supported and actuated by two lift rod assemblies located adjacent each end of the frame member 239.

Vertical movement is imparted to the shuttle bar assemblies by means of a pair of fluid actuated cylinders 248 which are mounted on the frame member 239 and connected to each of the connecting yokes 240 centrally thereof, as best seen in Figure 6, in a manner similar to that by which the lift rods are secured to the yoke. As seen in Figure 6, the piston rod 249 is received through the connecting yoke 240 and the filler plates 242 and the assembly is maintained by means of a nut 247. In order to prevent tilting or angling of the shuttle bar assembly as it is being raised or lowered by the cylinders 248, an idler rack assembly indicated generally at 250 is provided at each end of each connecting yoke. The idler rack assemblies are best seen in Figures 6 and 12 and comprise a pair of brackets 252 welded or otherwise secured to the yoke 240 and in turn supporting anti-friction bearings 254 which rotatably carry a shaft 256 (Figure 12). Pinned to the shaft 256 is a pinion 258, the teeth which are engageable with an idler rack 260 which is bolted to a depending bracket 261 secured to the table 38. From the above described structure, it is seen that the group of shuttle bars may be moved vertically upwardly or downwardly as desired, and that the shuttle bars proper are free to move horizontally between the track rollers 222 and 232.

Horizontal motion is imparted to the shuttle bars 26 by means of a fluid actuated cylinder 262 (Figure 12) having a piston rod 268 over which is received a drive bracket 264 held in position by a nut 270. The drive bracket 264 is pinned as at 272 to a horizontal rack 274 which is supported by the frame member 239, as seen in Figures 6 and 12. The rack is engageable with a pinion 276 pinned to and rotatable with a shaft 278 which is supported by conventional pillow block bearings 280. The shaft 278 carries for rotation therewith a plurality of pinions 282 (Figure 6), said pinions being substantially in line with each of the shuttle bars 26. Each of the pinions 282 is engageable with a rack 284. Two of the racks 284 are supported by the frame member 239 while the remaining four racks 284 are supported by one of the frame members 241 (Figure 6). Each of the racks 284 is secured at the extreme end thereof to a guide plate 286 (Figure 8) and a retainer 288 which is secured to the guide plate by means of a plurality of cap screws 290 (Figures 8 and 13). Both the guide plate and retainer are slotted in such a manner that when assembled they present an opening 292 (Figure 13) to receive the rack 284 which is held in position by means of a pin 294. A cover plate 296 is also secured to the guide plate 286 by means of a plurality of cap screws 298 and is provided with an opening 300 adapted to slidably receive a drive rod 302. The upper portion of the drive rod is accurately located relative to the member 204 by means of dowel pins 306 and is secured to the member 204 by means of cap screws 304. From the foregoing description, it is seen that as the fluid actuated cylinder 262 is actuated in either direction, as will be described hereinafter, the motion of its piston rod is transmitted through the rack 274 to the shaft 278 and thence through the various pinions 282 to each of the related racks 284. The racks 284, when so moved, will carry with them the shuttle bars 26 which are track supported in the rollers 222 and 232, as described heretofore. Due to the sliding engagement of the bar 302 in the opening 300, the shuttle bar portions 200 are free to be moved vertically upwardly and downwardly, as heretofore described.

*Press*

In the disclosed embodiment of the invention, both a right and a left hand press are utilized each having three separate press stations. The relative locations of the presses are shown in Figure 1, wherein the right hand press, which reduces the diameter of the first end of each tube, is designated 28, and the left hand press, which reduces the diameter of the second end of each tube, is designated 34. The presses 28 and 34 are identical in construction and the construction thereof is illustrated in Figures 14, 15 and 16. It should be noted that Figure 15 is a composite view of the press and that the first station, designated A—A, represents a sectional view taken at the line A—A of Figure 14. Similarly, the second and third stations, designated B—B and C—C, respectively, represent sectional views taken at the lines B—B and C—C, respectively, of Figure 14.

The press frame 320 is conventional and is of the type known as a C-frame press because of the shape of the throat 322. The presses in the illustrated embodiment have three stations differing only in the size of the forming die at each station, which becomes successively smaller from the first through the last station of the presses.

Each of the press stations comprises a tube clamping assembly indicated generally at 324 and a tube forming or reducing station indicated generally at 326. The upper movable portion of the tube clamping assembly 324 is supported by and actuated by a fluid operated cylinder 328 having a piston rod 330 which threadably receives the male or ball portion 332 of a ball and socket type swivel joint. The portion 332 is retained on the piston rod 330 by means of a pin 334. An annular rubber mounting ring 336 is received over the shank of the ball portion 332 and is compressed between the ball portion 332 and a retainer ring 338 which is secured to a platen 340 by means of a plurality of cap screws 342. The platen 340 also comprises the female or socket portion of the ball and socket joint and the rubber mounting ring 336 permits the movable portion of the tube clamping assembly to conform to any irregularities in a tube which is being clamped.

The platen 340 is provided with an opening 343 (Figure 15) adapted to receive a clamp shoe 344 having an inclined wedge surface 346 which is engaged by a corresponding surface on a key plate 348 which is wedged against the clamp shoe by means of a locking screw 350. A key 351, which is received half and half in the platen 340 and the clamp shoe 344, is secured to the platen by a cap screw 353 (Figure 14) and is provided for the purpose of taking the horizontal thrust load of the forming die which otherwise might move the shoe out of position. A guide rod assembly indicated generally at 352 comprises a horizontally disposed plate 354 one end of which is received over the piston rod 330 and is pinned thereto as at 356. The opposite end of the plate 354 is received over a small diameter portion 358 of a guide rod 360 and retained thereon by means of a nut 362. The guide rod 360 extends upwardly of the plate 354 and is slidably received through a bushed opening 364 in the frame 320. A limit switch cam 366 is received over the rod 360 and is held in place by means of a set screw 368. The purpose of the limit switch cam is to actuate a limit switch LS1 (Figures 15 and 17), as will be described in conjunction with the operational description of the apparatus. The purpose of the guide rod assembly 352 is to prevent rotation of the movable portion of the clamping arrangement about the axis of piston rod 330.

The stationary portion of the clamping assembly is indicated generally at 370 and comprises an anvil 372 which is secured to the frame 320 by means of a plurality of cap screws 374 and is positioned by means of a depending key portion 376 received within a corresponding slot in the frame. The anvil 372 is provided with an opening 378 (Figure 15) wherein is received a clamp shoe 380 which is clamped in position by means of a key plate 384 and locking screw 386 in the same manner as described relative to the clamp shoe 344. A key 391 is provided to prevent horizontal displacement of the shoe 380 during the forming operation being performed on a tube held between the jaws.

Referring now to the forming assembly of the press, a fluid actuated cylinder 390 is horizontally mounted in the press. A piston rod 392 projects from the cylinder and threadably receives thereover a flanged sleeve 394 retained in place by means of a pin 396. A flanged collar 398, which is circular in section, is received over the flanged sleeve 394 and supports a die slide 402 by means of a plurality of cap screws 400. Secured by means of a plurality of cap screws 404 to the die slide, as best seen in Figure 14, is a die holder 406 adapted to receive the proper die 407 for the particular station.

Horizontal adjusting means 408 (Figures 15 and 16) are provided by means of which the dies may be aligned with a tube held in the clamping assembly. The adjusting means 408 comprises a spacer 410 bolted or otherwise secured to the frame 320. The spacer 410 supports a gib-way 412 which is provided with a T-slot 414 to slidably receive the T-portion 416 of the die slide 402. Also received within the key slot 414 on each side of the T-portion 416 are adjustable gibs 418. As best seen in Figure 16, the gibs, together with the die slides, may be moved horizontally by means of jack screws 420 which are threadably received through the gib-way 412 and bear against the outer surface of the adjusting gib 418. When the die has been properly positioned, the clamping screws 422 are tightened down to hold the gibs and die in that position. Clearance, indicated at 423 in Figure 14, is provided between the flanged sleeve 394 and the collar 398 in order to accommodate adjustment of the die relative to the piston rod 392.

Vertical adjustment of the clamping shoe 380 may be accomplished by placing shims of the proper thickness under the shoe in the opening 378.

Threaded into the back face of the die slide 402 is a cam rod 424 (Figure 14) carrying a cam 426 which is secured thereto by means of a set screw or pin 428. The purpose of the cam 426 is to actuate a limit switch LS2 which is carried on a limit switch bracket 430 which in turn is secured to the spacer 410. The purpose of the limit switch will be explained in conjunction with the operational description of the machine.

Projecting rearwardly of the cylinder 390 is a tail rod 432 supportably received through a bushed opening 433 of a guide bar 434 which is secured to or formed integrally with the frame 320. The outer end of the tail rod is threaded as at 436 to receive thereover a pair of stop nuts 438 on either side of a ring 440. The position of the ring may be varied, as desired, along the threaded portion of the tail rod and the purpose of the ring is to actuate at the proper time a limit switch LS8 (Figure 17) to thereby determine the length of stroke of the piston rod and the die and also determine the amount by which the die is forced over the tube.

Conventional cooling means (not shown) are provided for each of the dies whereby a coolant fluid is flowed over the tube and die and is caught in a coolant drip pan 442 to be discharged therefrom to a sump (not shown).

*Operation*

The operation of the tube reducing press may be best described with reference to the schematic hydraulic circuit of Figure 17. Referring to this figure, it may be seen that only one of the presses with its three stations is shown inasmuch as the operation of the second press is identical.

The described embodiment of the tube reducing press is constructed so that the tubes must be jogged through the finger assemblies of the feed chute until the first tube has been deposited from the feed chute onto the feed roller assembly and has been indexed by the shuttle bar mechanism from the feed rollers into the first press station. At this time, the operation of the machine becomes completely automatic and the reducing press will continue to run until no tubes remain in the machine or until the machine is shut off.

At the start of the automatic operation of the machine, it may be presumed that the following conditions are met:

(1) All pumps are running.

(2) The clamping cylinder rams are in the raised position wherein limit switches LS1-A, B and C are tripped so that a reversing type clamp cylinder pump 450 is in the neutral position.

(3) The rams of the side cylinder 390 are in the return or retracted position wherein limit switches LS2-A, B and C are tripped so that a die cylinder pump 452 is discharging freely into a reservoir 453 through a four-way valve 454.

(4) The shuttle bars are in their lowered position wherein limit switch LS4 is tripped at which time a shuttle cylinder pump 456 is maintaining pressure in the rod-end chamber 458 of the shuttle lift cylinders 248.

(5) The shuttle bars are in the indexed position wherein limit switch LS3 is tripped so that an indexing cylinder pump 462 is maintaining pressure in the advance chamber 464 of the index cylinder 262 and simultaneously is maintaining pressure in the rod-end chamber 468 of the finger actuating cylinder 80.

(6) At least one of the switches LS6 is tripped by a tube resting in a press station.

It should be understood that pumps 450 and 452 are driven by an electric motor 472; pump 456 is driven by a motor 474; and pump 462 is driven by a motor 476. It should also be noted that necessary safety valves have been provided, one of which is shown at 455 in Figure 17.

As mentioned above, at least one of the limit switches designated LS6 must be tripped in order for a press cycle to occur. The reason for this is that when no additional tubes are being fed into the press from the feed chute the machine will continue to repeat the operational cycles until the last tube moving through the sequential press stations has been removed from the last station of the second press and deposited on the discharge ramp, at which time the machine will automatically stop.

As was described relative to the feed roller assembly, each tube, when deposited on the rotating feed rollers, is advanced against a stop which positions the tube longitudinally thereof. As the tube is moved by the shuttle bars from the rollers into the first press station and subsequently is moved from each press station to the next successive station, the magnets, which are positioned at each notched portion of the shuttle bars, firmly hold the tube in its proper position as determined by the stop 24. No further positioning of the tube is required as it passes through the three stations of the first press. Similarly, after the tube has left the first press and is deposited by the shuttle bars on the continuously rotating reversing rollers the tube is moved by the rollers against a stop 32 which properly positions the tube relative to the second press. The tube is transferred by the shuttle bar through the various stations of the second press and once again is firmly held in proper position by the magnets of the shuttle bars.

When the first tube has been deposited at station A of the first press, thereby tripping limit switch LS6–A, the operator pushes the cycle start button (not shown). An electrical circuit is thereupon closed to energize a solenoid 478 of a solenoid controlled reversing type pump 450. The pump 450 now discharges pressure fluid to the advance chambers 480 of each of the clamping cylinders 328 thereby moving the clamping shoe 344 downward to clamp the tube in position in the press. Referring for a moment to Figure 1, it is seen that a plurality of aligned V-shaped supports 481 are provided on the table 38 to support the tube at each press station.

When the tube is clamped, pressure begins to build up in the chambers 480 and in lines 482 until a pressure switch PS1 is tripped thereby completing a circuit to energize solenoid 484 of a four-way solenoid operated valve 454 to shift the valve spindle downward so that pressure fluid flows from pump 452 to the advance chambers 486 of cylinders 390 and simultaneously fluid is exhausted from the return chambers 488 to the reservoir 453. The cylinder ram and die thereby advance and the die is passed over the end of the tube to reduce the diameter of the tube end a predetermined amount.

While the tubes are clamped and the tube end is being formed, as described above, the start button also energizes a solenoid 490 to shift the spindle of a solenoid operated valve 492 to direct pressure fluid from a pump 462 to the return chamber 494 of index cylinder 262 while exhausting chamber 464, thereby moving the shuttle bars 26 to a position such that, when the shuttle bars are raised, any tube on either of the roller assemblies or at any press station will be picked up and indexed.

Depressing the start button also energizes a solenoid 496 of a solenoid operated valve 498 to direct fluid from the pump 462 to the piston end 500 of cylinder 80 whereby the fingers 56 and 57 are oscillated, as explained heretofore, to feed a tube from the feed chute onto the rollers 22.

At the end of the side or die cylinder stroke, the rings 440 on the tail rods 432 of each die cylinder 390 trip the limit switches LS8–A, B and C thereby causing solenoid 484 of four-way valve 454 to be de-energized and solenoid 502 of valve 454 to be energized. Energizing solenoid 502 shifts the spindle of the valve upwardly and causes pressure fluid to flow to the return chamber 488 of each cylinder 390 and simultaneously causes fluid to be exhausted from the chambers 486 to the reservoir 453 whereupon the die cylinder rams are returned to their starting position.

When the die or side rams reach the return end of their stroke, limit switches LS2–A, B and C are tripped thereby causing solenoid 478 of pump 450 to be de-energized and thereby also closing a circuit to energize solenoid 504 of pump 450. The pump 450 now reverses the flow of pressure fluid and directs pressure fluid to the return chambers 506 of the clamp cylinders 328 thereby moving the rams of the cylinders upwardly to unclamp the tubes.

When the clamp cylinders reach the upward limit of their return strokes, limit switches LS1–A, B and C are tripped thereby causing solenoid 504 to be de-energized at which time the pump is in a neutral position and no pressure fluid is pumped to the cylinders 328.

Tripping limit switches LS1–A, B and C also closes a circuit to energize the solenoids 508 and 510 of solenoid operated valves 512 and 514, respectively, thereby moving the spindles of these valves to direct flow of pressure fluid from the pump 456 to the ram end chamber 516 of the shuttle lift bar cylinders 248 and simultaneously exhaust fluid from the rod end chambers 458 to the reservoir 453. The pump 456 is a flow dividing pump which is adapted to discharge equal amounts of fluid at the same pressure from two discharge ports. The shuttle bars 26 thereby move vertically upward lifting the tube off of roller assembly 22 and also lifting the tube from the supports at the first press station.

When the shuttle bars 26 reach their highest position, limit switch LS5 is tripped causing solenoid 490 of the valve 492 to be de-energized. The valve spindle is thereupon spring-returned to the position illustrated in the drawing thereby directing flow of pressure fluid from the pump 462 to the advance chamber 464 of the shuttle indexing cylinder 262 thereby indexing the tube to the next station of the press. At the end of the indexing stroke of the shuttel bars, limit switch LS3 is tripped by the yoke 240 causing the solenoid 496 of valve 498 and also the solenoids 508 and 510 of the valves 512 and 514, respectively, to be de-energized, whereupon the spindles of each of these valves are spring-returned to the positions shown in Figure 17. Pressure fluid is now directed from the flow dividing pump 456 to the rod or "down" end 458 of the cylinders 248 causing the shuttle bars to move downwardly and deposit the tube onto the clamping anvils of the next sequential press station. Depositing one or more tubes on the clamping anvils trips limit switch LS6, as described heretofore. The lowering of the shuttle bars to the bottom of their stroke trips limit switch LS4 at which time the next cycle of operation is ready to begin.

While the indexing is occurring, pressure fluid also flows from the pump 462 through the valve 498 to the rod-end chamber 468 of the cylinder 80 thereby re-setting the fingers 56 and 57 of the finger assemblies 48 and permitting a tube to be fed to a position between the fingers 56 and 57, as illustrated in Figure 2 and ready to be fed to the next sequential finger position during the next cycle. At this time a tube is also fed from the last finger assembly onto the feed rollers 22.

As the cycle is continually repeated, the first tube is advanced through the right hand press, indexed onto the reversing rollers 30, positioned against stop 32, advanced through the left hand press and placed on the ramp 36. The machine will continue to operate until no tubes remain in the machine or until the machine is stopped.

Various pressure relief switches and safety switches are provided to instantly stop the cycle of operation during any portion thereof at which a malfunction should occur. One such malfunction which might occur would be an imcomplete stripping of a tube from one of the press dies. If this should occur, the stuck tube would trip a safety limit switch LS7 causing the automatic cycling to stop. It would then be necessary to clear the die and then restart the cycle with the start push button It may be desired at times to reduce the diameter of only one end of a group of tubes. This may be easily accomplished on the disclosed embodiment of the invention by merely removing the die 407 from either the right hand or the left hand press prior to the start of the run.

This invention is not limited to the embodiment disclosed above. It could be utilized, for example, where successive machining operations are to be performed on the ends of a solid workpiece, or to heat-treat the ends of consecutive workpieces, or for any project wherein the ends of consecutive workpieces are to be treated while the workpiece is held stationary axially thereof. This feature permits simplification of the device because it is only necessary to position the workpieces axially thereof only once for each end of the workpiece regardless of the number of treating stations required. The machine is also greatly simplified due to the fact that no reversal of the workpieces end to end is necessary in order to treat opposite ends thereof. This feature both simplifies the machine and greatly reduces the amount of handling time.

We claim:

1. In a machine for treating an end of an elongated magnetizable workpiece, the combination of: a treating device having a plurality of stations; a plurality of workpiece supports aligned with respective stations; a positioning station prior to said plurality of stations for positioning each workpiece axially thereof; means for transferring each workpiece from said positioning station through said plurality of stations while holding said workpiece against axial movement, said transferring means comprising a plurality of shuttle bars, means for moving said shuttle bars vertically upward to raise said workpiece, then moving said shuttle bars radially of said workpiece to move the latter into alignment with a succeeding station, and then moving said shuttle bars vertically downward to lower said workpiece to a succeeding support; magnets carried by said shuttle bars for holding the workpiece against axial movement during transfer thereof; and means for clamping said workpiece against axial movement during treatment of the workpiece end.

2. In a machine for treating an end of an elongated magnetizable workpiece, the combination of: a treating device having a plurality of stations; a plurality of workpiece supports aligned with respective stations; a positioning station preceding said plurality of stations for positioning each workpiece axially thereof; means for transferring each workpiece from said positioning station through said plurality of stations while holding the workpiece against axial movement, said transfer means comprising a plurality of shuttle bars, substantially V-shaped notches in each shuttle bar successively alignable with respective stations and arranged to engage the workpiece when the shuttle bars are raised; means for raising said shuttle bars to a position above said supports, then moving said shuttle bars from alignment with one support into alignment with the next successive support, then lowering said shuttle bars; a magnet secured to the shuttle bars adjacent each notch, each magnet being formed substantially to the contour of the notch to provide two point magnetic attraction on the workpiece at each notch for holding the workpiece against axial movement when the indexing means are activated; and means for clamping said workpiece against axial movement during treatment thereof.

References Cited in the file of this patent

UNITED STATES PATENTS

| | | |
|---|---|---|
| 152,185 | Somers | June 16, 1874 |
| 701,024 | Edwards | May 27, 1902 |
| 1,076,166 | Slick | Oct. 21, 1913 |
| 1,362,345 | O'Brien | Dec. 14, 1920 |
| 1,628,618 | Spencer | May 10, 1927 |
| 1,871,077 | Mowat | Aug. 9, 1932 |
| 1,940,354 | Kerr | Dec. 19, 1933 |
| 2,210,531 | Engelbaugh et al. | Aug. 6, 1940 |
| 2,300,760 | Amigo | Nov. 3, 1942 |
| 2,333,926 | Hapman | Nov. 9, 1943 |
| 2,572,999 | Elliot | Oct. 30, 1951 |
| 2,722,130 | Caldwell | Nov. 1, 1955 |
| 2,728,253 | Gettig | Dec. 27, 1955 |
| 2,732,932 | Strock | Jan. 31, 1956 |
| 2,750,716 | Sanester | June 19, 1956 |
| 2,760,378 | Van Deventer | Aug. 28, 1956 |